United States Patent Office
3,305,442
Patented Feb. 21, 1967

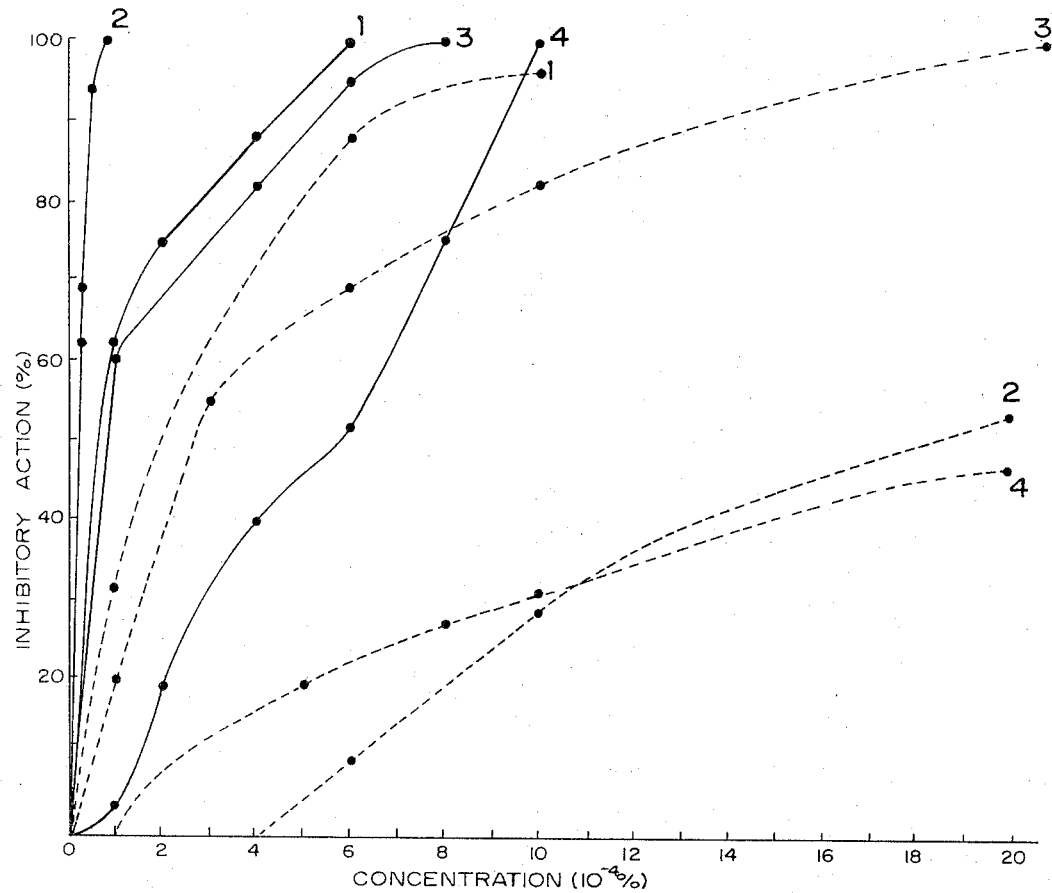

3,305,442
ORGANIC TIN SULFAMATES AND WOOD
PRESERVATIVES USING THE SAME
Koichi Nishimoto, Fushimi-ku, Kyoti, Goro Fuse, Nishinari-ku, Osaka, and Michio Nakanishi, Nakatsu, Japan, assignors to Yoshitomi Pharmaceutical Industries, Ltd., Higashi-ku, Osaka, Japan
Filed Nov. 26, 1963, Ser. No. 326,104
12 Claims. (Cl. 167—38.6)

This invention relates to new organic tin compounds and also to the use thereof as preservative particularly as wood preservative.

Due to the recent shortage of wood resources the rationalized utilization of wood has become a matter of great importance, and in the field of wood preservation there has recently been an increasing demand for preservatives which would be effective in their respective applications such as preservation of railroad sleepers, electric poles, mining beams and struts, foundation piles, building materials, shipbuilding and coach manufacturing materials, as well as new types of building material such as plywood and fiber board. Furthermore, a high demand exists as well for improved wood preservatives for protection of green logs.

In these circumstances, studies are in progress by many of those concerned, but no fully satisfactory preservatives have yet been developed or reported.

It is therefore an object of this invention to provide novel compounds which are quite effective as wood preservatives.

It is also an object of this invention to provide novel organic tin compounds which have powerful fungicidal and fungistatic properties as well as insect repellent properties, improved light resistance and solubility, and are useful as wood preservatives.

It is still another object of this invention to provide excellent wood preservatives containing the above mentioned novel organic tin compounds as essential ingredients.

Other objects, features and advantages of this invention will be apparent from the following description, a part of which will be made by referring to the accompanying drawing which shows inhibitory action curves of a wood preservative of this invention and of conventional wood preservatives with respect to *Coriolellus palustris*.

The novel organic tin compounds with which the present invention is concerned are trialkyl-tin sulfamate represented by the following general formula:

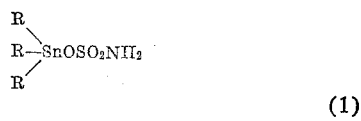

(1)

wherein R represents an alkyl group having 1–8 carbon atoms.

It has been found that these trialkyl-tin sulfamates have powerful fungicidal and fungistatic properties as well as insect repellent properties and have also improved light resistance and solubility so that they are excellent when used as wood preservatives.

Examples of alkyl group represented by R in the above Formula 1 are methyl, ethyl, propyl, isopropyl, butyl, secondary butyl, tertiary butyl, hexyl, octyl, 2-ethylhexyl, etc. groups.

The trialkyl-tin sulfamates of the Formula 1 may be produced by reacting a bis(trialkyl)tin oxide with sulfamic acid. The reaction may be carried out in the presence or absence of a solvent. Example of useful solvent are aromatic hydrocarbons such as benzene, toluene, etc.; alcohols such as methyl alcohol, ethyl alcohol, isopropanol, tertiary butanol, etc.; ketones such as acetone; dioxane, etc.; glycols such as ethylene glycol, polyethylene glycol, etc. The reaction may be conducted at room temperature or under heating, preferably under reflux when a solvent such as hydrocarbon is used. The reaction product, tri-alkyl tin sulfamate may be isolated from the reaction mixture by any suitable procedure such as distillation leaving the objective compound as residue in the form of waxy solid or oil. It is also possible to employ a water-miscible solvent (e.g. methanol, ethanol, isopropanol, t-butanol, acetone, dioxane, ethylene glycol, polyethylene glycol, etc.) as the reaction medium so that the tri-alkyl tin sulfamate will be obtained as a solution in the said solvent, said solution, without isolating the sulfamate therefrom, being used as a wood preservative as such or after dilution with a suitable amount of water.

The fungicidal and growth-inhibitory activity on wood destroying fungi of trialkyltin sulfamates of this invention is 0.001 to 0.002 percent in the total inhibitory point when determined by a malt-agar culture test. For example, when conducting a series of tests by inoculating *Coriolellus palustris* on each of agar culture mediums containing tri-n-butyltin sulfamate and tri-n-propyltin sulfamate in various concentrations and observing the fungi growth during the culture, the following results were obtained:

| Compound | Concentration, Percent | Culturing Time | |
|---|---|---|---|
| | | 48 hrs. | 96 hrs. |
| Tributyltin sulfamate | 0.0005 | ± | 1 mm. |
| | 0.001 | − | ± |
| | 0.002 | − | − |
| | 0.004 | − | − |
| Tripropyltin sulfamate | 0.0005 | ± | ± |
| | 0.001 | − | ± |
| | 0.002 | − | − |
| | 0.004 | − | − |

Remarks: The sign − indicates that the fungus does not grow or the fungus has been sterilized at the indicated concentration of the compound, while the sign ± indicates that the fungus growth is inhibited or the fungus is still alive but its growth is not in progress. The numeral 1 mm. in the table indicates the width of the fungus infected area on the culture medium.

Furthermore, the excellent strong fungicidal and growth-inhibitory activity of the compounds of this invention is not reduced even when irradiated with light rays for a prolonged period of time. This is extremely significant because one of the most important properties required for wood preservatives is in the stability of the activity or effectiveness. It has been found that the organic tin compounds of this invention remain substantially stable when tested for the light resistance by a universal weather meter. In fact, no noticeable change in the fungicidal activity has been seen even when irradiated for a period of time equivalent to 6 months exposure to atmospheric sunlight rays, and the compounds of this invention are far more stable than any of the conventional preservatives including creosote, pentachlorophenol and organic mercury compounds. For example, when the inhibitory activity is plotted against the concentration in respect of each of tri-butyltin sulfamate, ethylmercuric acetate, phenylmercuric acetate and sodium pentachlorophenolate which have been irradiated in a weather meter, the curves as shown in the accompanying drawing were obtained. In carrying out these tests, a 0.1% aqueous solution of each of the above compounds was exposed to arc irradiation for 104 hours by weather meter of Toyo Rika Kogyo Co., Ltd., Tokyo, Japan, the said exposure corresponding to 6 months natural exposure. The inhibitory activity against the growth of *Coriolellus palustris* on an agar culture medium of each of the solutions before and after the said irradiation was plotted against the concentration. In the drawing, the numerals 1, 2, 3 and 4 indicate growth inhibitory action curves respectively of tributyltin sulfamate, ethyl mercuric acetate, phenylmercuric acetate and sodium pentachlorophenolate, with the solid lines showing curves of freshly prepared preservatives and the broken lines showing curves of the same preservatives but after the above mentioned irradiation or exposure. It will be noted from these curves that the wood preservative of this invention is far more stable against light then any of the conventional preservatives.

A wood preservative must be capable of penetrating into wood texture. Trialkyltin sulfamates of this invention have not only high penetrative properties but also excellent water solubility, and therefore they can penetrate deep into the wood texture (even of green logs or green timbers of a high water content) so that the external attack by wood destroying fungi, staining fungi and wood borers can be prevented. For example, the solubility in water of tri-n-propyltin sulfamate is 56% (w./v.) at 25° C. and that of tri-n-butyltin sulfamate is 22% (w./v.). In contrast thereto, conventional wood preservatives are poor in the penetrativity so that the fungicidal effects have not been fully displayed. According to this invention these drawbacks have been overcome.

The wood preservatives of this invention are characterized by containing a trialkyltin sulfamate as the essential ingredient. Since the sulfamates of this invention are soluble in water and various other solvents it is preferable to formulate the wood preservative in the form of a solution. Examples of useful solvent are water, alcohols such as methanol, ethanol, isopropanol, t-butanol, etc., ketone such as acetone; dioxane, etc., glycols such as ethylene glycol, polyethylene glycol, etc., or a mixture of two or more of these solvents. When a highly concentrated transparent solution is desired, it is recommended first to dissolve the sulfamate in a water miscible organic solvent such as those exemplified above and then to dissolve the solution in a desired amount of water. It is also possible to prepare a wood preservative in the form of emulsion in a manner well known in the art.

The concentration of a trialkyltin sulfamate in the solution or emulsion is not critical and may vary over a wide range depending upon the particular use.

In many cases, better results may be obtained if the trialkyltin sulfamate is used along with one or more of other known fungicides and/or insecticides suitable for the purpose of wood preservation. Among such fungicides or insecticides which can be incorporated into the wood preservative of this invention are, for example, arsenic acid, arsenous acid, copper arsenate, boric acid, mercury chloride and other inorganic compounds; ethyl mercuric chloride, O,O-dimethyl-1-hydroxy-2,2,2-trichloroethyl phosphonate (Dipterex) and other organic compounds, etc.

When the wood preservative of this invention is formulated as an emulsion it may also contain one or more of known water immiscible fungicidal or insecticidal organic compounds such as benzene hexachloride, dieldrin, aldrin, endrin, isodrin, etc.

The treatment of wood with the wood preservative of this invention may be carried out in a conventional manner. Thus, for example, the preservative may be applied to wood by the so-called non-pressure process such as spraying, brushing, dipping, diffusing, injection to living trees, or hot-cold tank process, etc. or by the so-called pressure process such as Bucherie process, Buthell pressure process or full cell process, Lowry pressure process or empty cell process, etc.

The wood preservatives of this invention are useful in all the applications (inclusive for building and marine uses and also for preservation of green logs in the lumbering industry, etc.) where conventional wood preservatives have been used.

According to this invention, wood may be preserved in both preventive and truly preserving ways and protected from the attack of various fungi and insects including termites, marine wood borers, *Lyctus brunneus* Stephens, etc.

*Example 1.—Preparation of tri-n-propyltin sulfamate*

Bis(tri-n-propyltin)oxide 511 g. and sulfamic acid 194 g. were refluxed together with 1 liter of benzene for 3 hours while stirring. Benzene was distilled off and then vacuum distillation with the addition of a small amount of methanol was repeated to completely remove any remaining benzene. There was obtained waxy solid of colorless tri-n-propyltin sulfamate, which when heated to 45-50° C. becomes viscous jelly. Index of refraction (25° C.) was 1.5102, and the tin content (analysis) was 34.5%.

*Example 2.—Preparation of tri-n-propyltin sulfamate*

Sulfamic acid 194 g. was added to bis(tri-n-propyltin) oxide 511 g. and the mixture was stirred at room temperature until the sulfamic acid was completely dissolved. Then 500 ml. of isopropanol was added and the stirring was continued to obtain a transparent and homogeneous solution. Then 1375 ml. of isopropanol was added to obtain a solution which contains 50 g. of tri-n-propyltin sulfamate per 100 ml. of the solution, which is easily soluble in water. The solution was diluted with a suitable amount of water to prepare a wood preservative.

*Example 3.—Preparation of tri-n-butyltin sulfamate*

Bis(tri-n-butyltin)oxide 60 g. and sulfamic acid 19.4 g. was refluxed together with benzene 100 cc. for 3 hours. Water formed during the reaction was removed by azeotropic distillation. The reaction mixture thus obtained was concentrated to obtain tri-n-butyltin sulfamate as an oily product. Index of refraction (25° C.) was 1.4962.

Calculated: C, 37.32%; H, 7.57%; N, 3.63%.
Analysis.—C, 37.85%, H, 7.61%, N, 3.75%.

*Example 4.—Preparation of tri-n-butyltin sulfamate*

Sulfamic acid 19.4 g. was added to bis(tri-n-butyltin) oxide 60 g. and the mixture was stirred at room temperature until the sulfamic acid was completely dissolved. Then 50 ml. of methanol was added and the stirring was continued to obtain a transparent and homogeneous solution. To this was added 155 ml. of methanol to obtain a solution which is readily soluble in water and which contains 50 g. of tri-n-butyltin sulfamate per 100 ml. of the solution. The solution was diluted with a desired amount of water to prepare a wood preservative of this invention.

*Example 5*

Tri-butyltin sulfamate was dissolved in water to be a 1-4% aqueous solution, which was an excellent wood preservative suitable for injection into wood under pressure. In place of tri-butyltin sulfamate, tri-propyltin sulfamate was used and similar result was obtained.

*Example 6*

Tri-butyltin sulfamate (or tri-propyltin sulfamate) was dissolved in an approximately equivalent volume of methanol. The solution was then diluted with water to form a 1-4% solution, which was an excellent wood preservative suitable for injection into wood under pressure.

*Example 7*

An aqueous solution containing 2% tri-butyltin sulfamate and 2% tri-propyltin sulfamate was prepared. The wood preservative was sprayed on wood.

Example 8

Tri-butyltin sulfamate was dissolved in an approximately equivalent volume of methanol. The methanol solution was dissolved together with boric acid and O,O-dimethyl-1-hydroxy-2,2,2-trichloroethyl phosphonate into water to obtain an aqueous wood preservative containing 1% tri-butyltin sulfamate, 7% boric acid and 2% O,O-dimethyl - 1 - hydroxy-2,2,2-trichloroethyl phosphonate. The wood preservative thus prepared was applied to wood by injection under pressure or by dipping wood into the solution.

Example 9

A water soluble preservative of the following composition (by weight):

| | Parts |
|---|---|
| Copper arsenate (CuHAsO$_4$) | 36 |
| Ethylenediamine | 24 |
| Tri-butyltin sulfamate (or tri-propyltin sulfamate) | 1 |
| Water | 49 | was diluted to 10 times with water. The aqueous wood preservative thus prepared was applied to wood by injection under pressure or by dipping wood into the solution.

Example 10

Ten parts of tri-butyltin sulfamate were dissolved in a mixture of 30 parts water and 20 parts methanol. To this solution was added a solution prepared by dissolving 15 parts of γ-1,2,3,4,5,6-hexachlorocyclohexane in an aromatic hydrocarbon (such as benzene, toluene), and emulsified with 5 parts of equivalent mixture of sorbitan-monolaurate and polyoxyethylene sorbitan-monolaurate. The emulsion thus prepared was diluted to 5–10 times with water and applied to wood by spraying.

What we claim is:

1. A tri-alkyltin sulfamate of the formula:

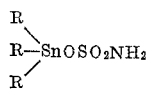

wherein R is alkyl of 1 to 8 carbon atoms, inclusive.
2. Tri-n-butyltin sulfamate.
3. Tri-n-propyltin sulfamate.
4. A wood preservative which comprises, as the essential ingredients, an effective amount of a tri-alkyltin sulfamate of the formula

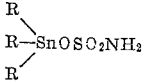

wherein R is alkyl of 1 to 8 carbon atoms inclusive, and a solvent therefor.

5. A wood preservative which comprises, as the essential ingredients, an effective amount of tri-n-butyltin sulfamate, and a solvent therefor.
6. A wood preservative which comprises, as the essential ingredients, an effective amount of tri-n-propyltin sulfamate, and a solvent therefor.
7. A method for producing a tri-alkyltin sulfamate of the formula

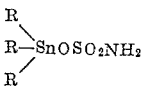

(wherein R represents an alkyl group) which comprises reacting the corresponding bis(tri-alkyltin)oxide with sulfamic acid.

8. A method for producing tri-n-butyltin sulfamate which comprises reacting bis(tri-n-butyltin)oxide with sulfamic acid.
9. A method for producing tri-n-propyltin sulfamate which comprises reacting bis(tri-n-propyltin)oxide with sulfamic acid.
10. A method of preserving wood which comprises applying thereto an effective amount of a tri-alkyltin sulfamate of the formula

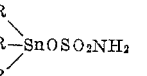

wherein R is alkyl of 1 to 8 carbon atoms inclusive.
11. The method of preserving wood which comprises applying thereto an effective amount of tri-n-butyltin sulfamate.
12. The method of preserving wood which comprises applying thereto an effective amount of tri-n-propyltin sulfamate.

No references cited.

TOBIAS E. LEVOW, *Primary Examiner.*

W. F. W. BELLAMY, *Assistant Examiner.*